United States Patent [19]

Taga et al.

[11] Patent Number: 4,691,594
[45] Date of Patent: Sep. 8, 1987

[54] HYDRAULIC CONTROL SYSTEM FOR AUTOMATIC TRANSMISSION

[75] Inventors: Yutaka Taga, Aichi; Kunio Morisawa, Okazaki, both of Japan

[73] Assignee: Toyota Jidosha Kabushiki Kaisha, Toyota, Japan

[21] Appl. No.: 689,305

[22] Filed: Jan. 7, 1985

[51] Int. Cl.⁴ .............................................. B60K 41/04
[52] U.S. Cl. ........................................ 74/869; 74/867
[58] Field of Search ............. 74/869, 868, 867, 752 C

[56] References Cited

U.S. PATENT DOCUMENTS

| | | | |
|---|---|---|---|
| 3,683,721 | 8/1972 | Vozumi | 74/868 X |
| 3,949,627 | 4/1976 | Murakami | 74/869 X |
| 4,023,444 | 5/1977 | Murakami | 74/868 |
| 4,050,332 | 9/1977 | Taga | 74/869 |
| 4,106,369 | 8/1978 | Taga | 74/869 |
| 4,145,937 | 3/1979 | Shindo et al. | 74/869 X |
| 4,391,166 | 7/1983 | Kubo et al. | 74/869 |
| 4,406,181 | 9/1983 | Kubo et al. | 74/869 |
| 4,437,358 | 3/1984 | Kubo et al. | 74/869 X |
| 4,570,511 | 2/1986 | Nishimura et al. | 74/868 |

FOREIGN PATENT DOCUMENTS

| | | | |
|---|---|---|---|
| 471132 | 9/1974 | Australia | 74/869 |
| 58-135547 | 3/1982 | Japan. | |

Primary Examiner—Allen D. Herrmann
Assistant Examiner—David Novais
Attorney, Agent, or Firm—Oblon, Fisher, Spivak, McClelland & Maier

[57] ABSTRACT

A hydraulic control system for an automatic transmission which includes first and second throttle valves which produce respectively first and second throttle pressures related to the position of a throttle valve in an intake path of an engine. The first and second throttle pressures are different from each other. The first throttle pressure is used for controlling a line pressure and the second throttle pressure serves as a control pressure for shift valves.

1 Claim, 4 Drawing Figures

| SPEED RANGE | | C0 | B0 | C1 | C2 | B1 | B2 |
|---|---|---|---|---|---|---|---|
| REVERSE | | O | X | X | O | X | O |
| DRIVE | FIRST SPEED | O | X | O | X | X | X |
| | SECOND SPEED | X | X | O | X | O | X |
| | THIRD SPEED | O | X | O | O | X | X |
| | FOURTH SPEED | X | O | O | O | X | X |
| THIRD | FIRST SPEED | O | X | O | X | X | X |
| | SECOND SPEED | X | X | O | X | O | X |
| | THIRD SPEED | O | X | O | O | X | X |
| SECOND | FIRST SPEED | O | X | O | X | X | X |
| | SECOND SPEED | O | X | O | X | O | X |
| LOW | | O | X | O | X | X | O |
| NEUTRAL AND PARKING | | O | X | X | X | X | X |

HYDRAULIC CONTROL SYSTEM FOR AUTOMATIC TRANSMISSION

BACKGROUND OF THE INVENTION

1. Field of the Invention

This invention relates to a hydraulic control system for an automatic transmission used in an automobile, and more particularly to a throttle pressure generator of a hydraulic control system for an automobile transmission.

2. Description of the Prior Art

To avoid power loss of an oil pump, a line pressure generating valve controls the line pressure sent to each frictionally engaging device in relation to the throttle pressure corresponding to a throttle position in an intake path. Also, a shift valve controls a shift point in relation to a governor pressure corresponding to the throttle pressure and vehicle speed to provide a proper value of drive torque. While the shift point is altered by changing a throttle cam to have a common hydraulic control system adapted to various types of engines and vehicles, conventional hydraulic control systems are provided with only one throttle valve and a common throttle pressure is sent to the line pressure generating valve and the shift valve. When the throttle cam is selected to provide the proper shift point, line pressure characteristics become undesirable so that a shock in speed change is disadvantageously increased.

While the publication of Japanese Utility Model Laid-open Sho No. 58-135547 discloses a hydraulic control system comprising a throttle valve for producing a throttle pressure used for a control pressure of the shift valve and another throttle valve for producing another throttle pressure used for the back pressure of a piston of an accumulator, the hydraulic control system does not have any controlling valves for controlling a line pressure in relation to an intake throttle position, and any concept of controlling the shift valve and the line pressure controlling valve by another throttle pressure is not shown in the prior art.

SUMMARY OF THE INVENTION

An object of the present invention is to provide a hydraulic control system for an automatic transmission which is adapted to various types of engines and vehicles and can set both shift point and line pressure characteristics so as to be proper.

To achieve this object, the hydraulic control system for the automatic transmission according to the present invention comprises first and second throttle valves respectively related to first and second separate positions of an intake throttle to use first and second throttle pressures for controlling respectively a line pressure generating valve and a shift valve.

Thus, by establishing an engaging oil pressure proper in speed change, throttle pressure characteristics can be set for generating a shock restraining line pressure in a line pressure generating valve and throttle pressure characteristics capable of obtaining a proper shift point in the shift valve separately in the respective throttle valves to provide both proper shift point and line pressure characteristics.

Preferably the first relationship corresponds to an engine output and the second relationship corresponds to the performance (acceleration characteristics, fuel consumption characteristics or the like) of the engine and vehicle.

The accompanying drawings, which are incorporated in and constitutes part of this specification, illustrates an embodiment of the invention and, together with the description, serves to explain the principles of the invention.

BRIEF DESCRIPTION OF THE DRAWINGS

FIG. 2 shows a schematic representation of an automatic transmission which the hydraulic control system in FIG. 1 is applied to;

FIG. 3 is a chart showing the clutch-and-brake engagement and release pattern.

DESCRIPTION OF PREFERRED EMBODIMENT

Figure 1:
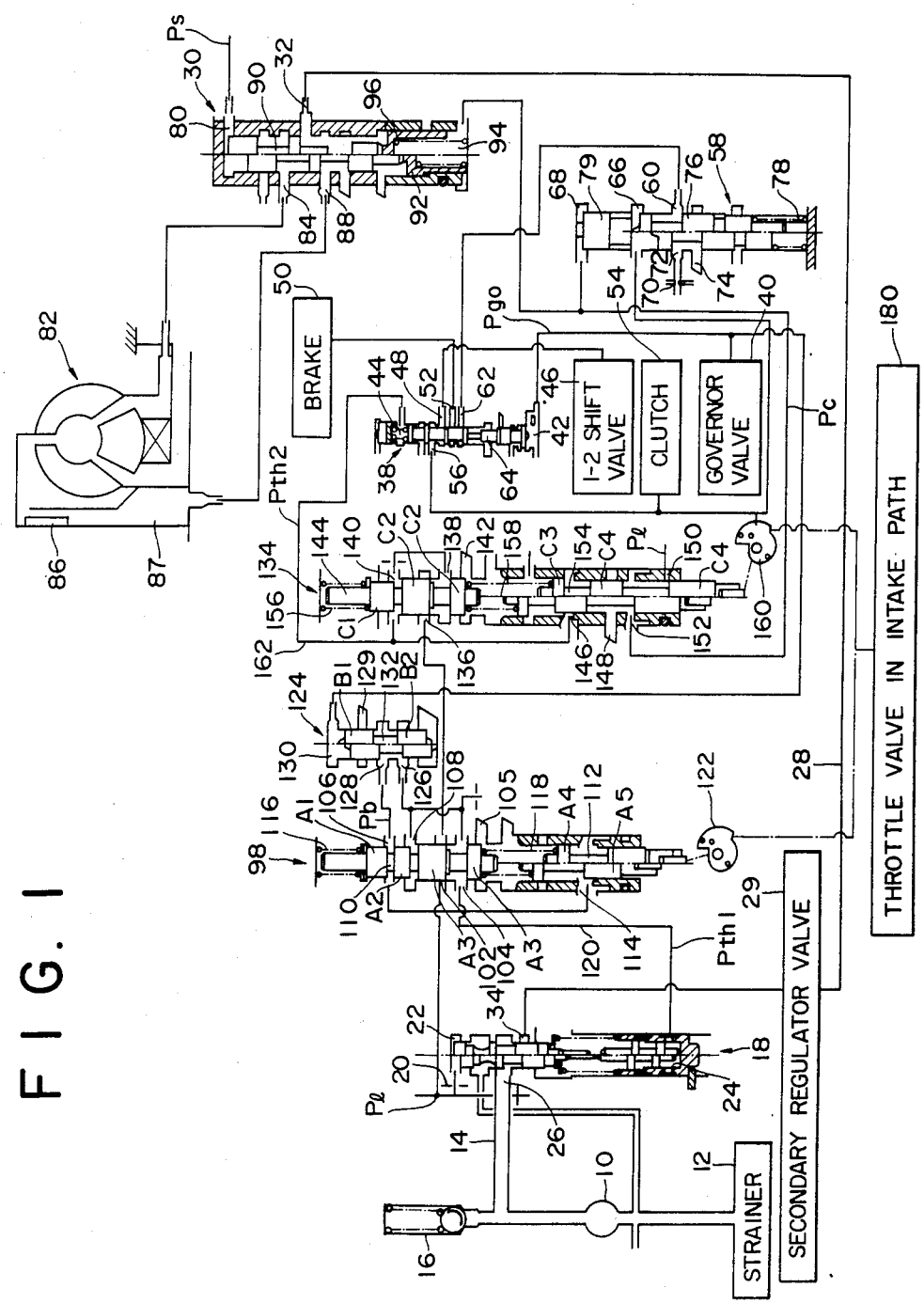
FIG. 1 is a schematic view showing a hydraulic control system according to the present invention.

An oil pump 10 pressurizes oil sucked through a strainer 12 and discharges it to a line pressure oil path 14. A relief valve 16 is open, when the line pressure Pl in the line pressure oil path 14 exceeds a predetermined value, to limit the upper limit of the line pressure Pl.

A primary regulator valve 18 as a line pressure generating valve is provided with a chamber 22 connected to the line pressure oil path 14 through an orifice 20, a chamber 24 supplied with a first throttle pressure Pth1, a port 26 connected to the line pressure oil path 14, a port 34 connected to an input port 32 of a relay valve 30 for a lock-up clutch through a secondary regulator valve 29 in an oil path 28 and a spool 36 for exerting a hydraulic throttle pressure force to the regulator valve 18. As the first throttle pressure Pth1 is increased, the hydraulic force acting on the regulator valve 18 is increased so as to increase the line pressure Pl.

A 2-3 shift valve 38 is provided with a chamber 42 for receiving a governor pressure Pgo related to vehicle speed from a governor valve 40, a chamber 44 supplied with a second throttle pressure Pth2, an input port 48 for receiving the line pressure Pl from an output port of a 1-2 shift valve 46 in the high speed stage of at least second speed, an output port 52 connected to a brake 50 put into the engaging condition during the period of second speed, an output port 56 connected to a clutch 54 put into the engaging condition during the period of third speed, a port 62 connected to an input port 60 of a 2-3 shift timing valve 58 and a spool 64 for selectively connecting the input port 48 to the output port 52 or 56 in relation to the governor pressure Pgo in the chamber 42 and the second throttle pressure Pth2 in the chamber 44. In second speed, the input port 48 is connected to the output port 52, the line pressure Pl is supplied to the brake 50, and in third speed, the input port 48 is connected to the output port 56 and the line pressure Pl is supplied to the clutch 54.

The 2-3 shift timing valve 58 comprises, in addition to the input port 60, a chamber 66 connected to the clutch 54, a chamber 68 supplied with a control pressure Pc in total enclosure, a port 72 connected to a drain through an orifice 70, a drain 74, a spool 76 for controlling the connection between the input port 60 and the drain 74, a spring 78 for urging the spool 76 to the chamber 66 and a spool 79 for receiving the control pressure Pc in the chamber 68 so as to urge the spool 76 toward the spring 78. When the speed is shifted up from second speed to third speed, the oil pressure in the chamber 66 is increased, while maintaining a value equal to the cylinder oil pressure in the clutch 54. When the oil pressure in the chamber 66 is still lower than a predetermined value i.e., the clutch 54 is still under the released condition, the spool 76 is pressed against the chamber 68 by the spring 78 and oil in the brake 50 is discharged gently through the output port 52 and the port 62 of the 2-3 shift valve 38 and the orifice 70 of the 2-3 shift timing valve 58 so that the brake 50 is still held under the engaged condition. When oil pressure in the chamber 66 reaches at least a predetermined value, i.e., the clutch 54 is put into the engaged condition, the spool 76 is moved against the spring 78 to connect the input port 60 to the drain 74. As soon as the clutch 54 is thus put into the engaged condition, oil in the brake 50 is discharged rapidly and the brake 50 is released. In the neighborhood of total enclosure, the 2-3 shift timing valve 58 is moved against the spring 78 by Pc in spite of increase of oil pressure in the clutch to that oil in the brake 50 is discharged rapidly through the drain 74.

The relay valve 30 comprises, in addition to the input port 32, a chamber 80 for receiving a lock-up signal pressure Ps, an output port 84 connected to a fluid torque converter 82, an output port 88 connected to an oil chamber 87 at the releasing side of a lock-up clutch 86 provided parallel to the fluid torque converter 82, a spool 90 for selectively connecting the input port 32 to the output port 84 or 88, a plug 92 provided coaxially with the spool 90, a chamber 94 for receiving the control pressure Pc for urging the plug 92 toward the spool 90 and a spring 96 for urging the plug 92 toward the spool 90.

When the lock-up signal pressure Ps is not supplied to the chamber 80, the spool 90 is pressed toward the chamber 80 and the input port 32 is connected to the output port 88. As a result, the lock-up clutch 86 is put into the engaged condition by oil pressure at the fluid torque converter 82 side and an engine torque is transmitted through the lock-up clutch 86. While the lock-up signal pressure Ps is supplied to the chamber 80, the spool 90 is pressed toward the chamber 94 and the input port 32 is connected to the output port 88. As a result, oil is supplied to the fluid torque converter 82 and the lock-up clutch 86 is put into the released condition by the oil pressure in the oil chamber 87 so that the engine torque is transmitted through the fluid torque converter 82.

A first throttle valve 98, a main constitutional element of the present invention, comprises an input port 102 connected to the line pressure oil path 14, an output port 104 for generating the first throttle pressure Pth1, a drain 105, a port 106 for receiving a cut-back pressure Pb, a port 108 connected to the output port 104, a spool 110 for selectively connecting the output port 104 to the input port 102 or the drain 105, a spool 112 provided coaxially with the spool 110, a port 114 connected to the port 106 to receive the cut-back pressure Pb, a spring 116 for urging the spool 110 toward the spool 112, a spring 118 provided between the spools 110 and 112 and a throttle cam 122 interlocked with a throttle valve 120 in an intake path for displacing the spool 112 toward the spool 110 by an amount corresponding to the throttle position. The oil pressure receiving areas of respective lands of the spool 110 are designated by A1, A2, A3 sequentially in the order from above to below, $A1 < A2 < A3$, and the oil pressure receiving areas of respective lands of the spool 112 are designated by A4, A5 sequentially in the order from above to below $A4 > A5$. Thus, the spool 110 receives a downward force from the spring 116, the cut-back pressure Pb of the port 106 and the first throttle pressure Pth1 of the port 108 and receives an upward force from the spring 118. The spool 112 receives an upward force from the cut-back pressure Pb of the port 114 and the throttle cam 122. The cut-back pressure Pb of the port 114 serves as an aid of the upward force to the spool 112. As the throttle position is enlarged, the spool 112 is urged toward the spool 110 by the throttle cam 122. As a result, a force by which the spring 118 presses the spool 110 toward the spring 116 is increased to generate the corresponding first throttle pressure Pth1. Thus, the first throttle pressure Pth1 is generated in the output port 104 as a first increasing function of the throttle position. The output port 104 is connected to the chamber 24 of the primary regulator valve 18 through the oil path 123.

The cut-back valve 124 comprises a port 126 for receiving the first throttle pressure Pth1, an output port 128 for generating the cut-back pressure Pb, a drain 129, a port 130 for receiving the governor pressure Pgo and a spool 132 for controlling the connection between the port 126 and the output port 128. The oil pressure receiving areas of respective lands of the spool 132 are designated sequentially by B1, B2 in the order from the upper land to the lower one, $B1 > B2$. As the governor pressure Pgo is increased, Pb is increased correspondingly. When the governor pressure Pgo is sufficiently large, Pb=Pth1. As a result, the first throttle pressure Pth1 is lowered and Pl is reduced so that the power loss of the oil pump 10 can be restrained. When $Pth1 \geq K \cdot Pgo$ (provided K is a constant), the output port 128 is connected to the drain 129 and the upper limit of the cut-back pressure Pb is controlled in response to the governor pressure Pgo.

A second throttle valve 134, a main constitutional element of the present invention, comprises an input port 136 connected to the input port 102 to receive the line pressure Pl, an output port 138 for generating the second throttle pressure Pth2, a port 140 connected to the output port 138, a drain 142, a spool 144 for selectively connecting the output port 138 to the input port 136 or the drain 142, a port 146 connected to the port 140, a drain 148, an input port 150 for receiving the line pressure Pl in D(drive) range, an output port 152 for generating a control pressure Pc, a spool 154 provided coaxially with the spool 144 to connect selectively the output port 152 to the input port 150 or the drain 148, a spring 156 for urging the spool 144 toward the spool 154, a spring 158 disposed between the spools 144 and 154 and a throttle cam 160 interlocked with the throttle valve 120 to push the spool 154 into the spool 144 as the throttle position is enlarged. The oil pressure receiving areas of respective lands of the spool 144, sequentially designated by C1, C2, C2 in the order from the upper land to the lower one, have the relationship of $C1 < C2$, and the oil pressure receiving areas of respective lands of the spool 154, designated by C3, C4, C4 sequentially in the order from the upper land to the lower one, have the relationship of $C3 > C4$. The spool 144 receives a downward force from the spring 156 and the second throttle pressure Pth2 in the port 140 and an upward force from the spring 158. The spool 154 is pushed toward the spool 144 by the throttle cam 160 as the throttle position is enlarged, so that the upward force from the spring 158 to the spool 144 is increased and thereby the second throttle pressure Pth2 becomes a second increasing function of the throttle position. The port 140 is connected to the shift valve such as the 2-3 shift valve 38 through the oil path 162 so that the speed change stage is controlled in relation to the second throttle pressure Pth2.

When the throttle position is within the range of 0–10% i.e., the throttle valve 180 is approximately in the idling position, the spool 154 connects the output port 152 to the input port 150 and Pc=Pl is provided. The lock-up signal pressure Ps supplied to the port 80 of the relay valve 30 is not brought to zero while the governor pressure Pgo exceeds a predetermined value. However, the large control pressure Pc is supplied from the output port 152 of the second throttle valve 134 to the port 94 of the relay valve 30 so that the spool 90 is moved toward the chamber 80 to connect the input port 32 to the output port 88. Thus, the lock-up is released and smooth running is ensured in the engine brake without transmitting the output of the engine mechanically through the lock-up clutch. Also, the control pressure Pc is supplied to the chamber 68 of the 2-3 timing valve 58 so that the port 60 is connected to the drain 74. When the throttle valve 180 is approximately in the idling position, engine torque is so low that the time of releasing the brake 50 is delayed relative to the engagement of the clutch 54 to generate a shock in the speed change. However, by connecting the port 60 to the drain 74 in the 2-3 shift timing valve 58 to speed up the discharge of oil from the brake 50, can be provided a proper changeover timing between the brake 50 and the clutch 54 to damp the shock.

To have the hydraulic control system adapted to various types of engines and vehicles, the throttle cams 122, 160 are interchanged. However, the first and second throttle valves 98, 134 are provided and the throttle cams 122, 160 can be selected independently from each other so that the most suitable line pressure characteristics and shift points can be provided.

Figures 2, 3:
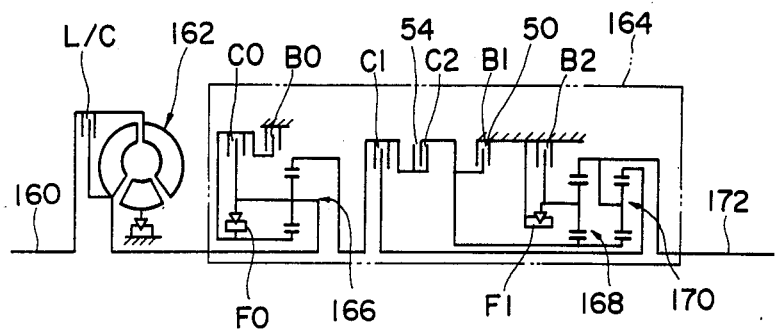

FIG. 2 is a schematic view showing an automatic transmission including gear mechanism and associated with the hydraulic control system in FIG. 1. The crank shaft 160 of the engine, an fluid torque converter 162, and a planetary gear unit 164 are arranged coaxially and are connected operatively. The planetary gear unit 164 has three planetary gear sets 166, 168, 170, clutches C0, C1, C2 brakes B0, B1, B2, one-way clutches F0, F1 and an output shaft 172. An lock-up clutch L/C is arranged in parallel to the torque converter 162.

FIG. 3 is a chart showing the clutch-and-brake engagement and release pattern. O repesents an engagement, and X represents a releasement.

Figure 4:
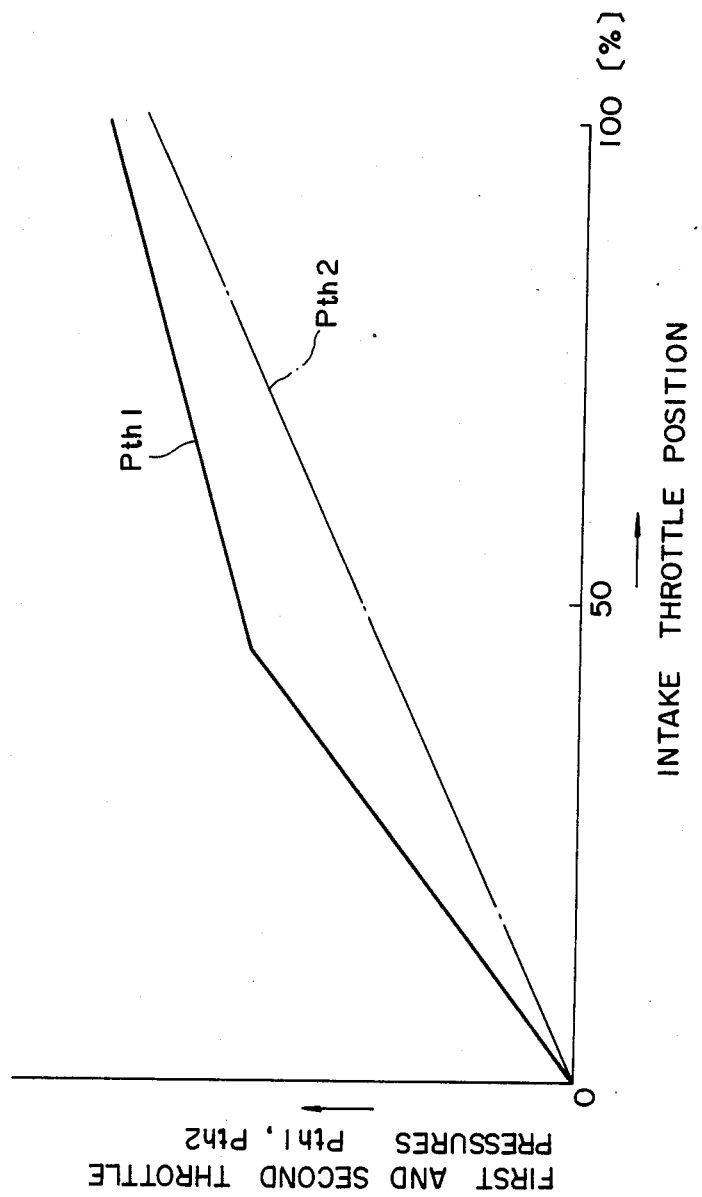
FIG. 4 is a graph showing a relationship between the intake throttle position and the first and second throttle pressures.

In FIG. 4 the relationship between the intake throttle position and the first and second throttle pressures Pth1, Pth2 produced by the first and second throttle valves 98, 134.

It will be apparent to those skilled in the art that various modifications and variation may be made in the elements of the invention without departing from the scope or spirit of the invention.

What is claimed is:

1. A hydraulic control system for an automatic transmission, comprising:
   a first throttle valve which produces a first throttle pressure having a first characteristic with respect to an output of an engine, wherein said first throttle valve comprises a first input port which receives a line pressure, a first output port for generating the first throttle pressure, a first spool for controlling a first flow area between the first input port and the first output port, a first spring for urging the first spool in a direction in which the first flow area decreases, and a first cam which rotates in relation to a movement of a member for controlling the output of the engine and urges the first spool in a direction in which the first flow area increases;
   a second throttle valve which produces a second throttle pressure having a second characteristic with respect to the output of the engine, wherein said second throttle valve comprises a second input port for receiving the line pressure, a second output port for generating the second throttle pressure, a second spool for controlling a second flow area between the second input port and the second output port, a second spring for urging the second spool in a direction in which the second flow area decreases, and a second cam which rotates in relation to the movement of the member for controlling the output of the engine and urges the second spool in a direction in which the second flow area increases;
   a valve for regulating the line pressure during a first performance relative to the output of the engine via said first throttle pressure; and
   a shift value for controlling a shift point of the automatic transmission during a second performance relative to the output of the engine via said second throttle pressure.

* * * * *

UNITED STATES PATENT AND TRADEMARK OFFICE
CERTIFICATE OF CORRECTION

PATENT NO. : 4,691,594

DATED : September 8, 1987

INVENTOR(S) : Yutaka Taga, et al

It is certified that error appears in the above-identified patent and that said Letters Patent is hereby corrected as shown below:

On the title page Insert

Foreign Application Priority Data
-- Jan. 6, 1984 [JP] Japan .............. 289/1984 --

Signed and Sealed this

Sixteenth Day of February, 1988

Attest:

DONALD J. QUIGG

Attesting Officer     Commissioner of Patents and Trademarks